United States Patent
Yang et al.

(10) Patent No.: US 12,261,310 B2
(45) Date of Patent: Mar. 25, 2025

(54) TRACTION BATTERY CELL EXPANSION ACCOMMODATING ENDPLATE AND EXPANSION ACCOMMODATING METHOD

(71) Applicant: Ford Global Technologies, LLC, Dearborn, MI (US)

(72) Inventors: Xiao Guang Yang, Northville, MI (US); Jingmei Shen, Troy, MI (US); Bogdan Bude, Canton, MI (US); Pratima Addepalli, Saline, MI (US); Connor McCann, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 750 days.

(21) Appl. No.: 17/081,404

(22) Filed: Oct. 27, 2020

(65) Prior Publication Data

US 2022/0131118 A1 Apr. 28, 2022

(51) Int. Cl.
*H01M 50/20* (2021.01)
*H01M 10/6554* (2014.01)

(52) U.S. Cl.
CPC ....... *H01M 50/20* (2021.01); *H01M 10/6554* (2015.04); *H01M 2220/20* (2013.01)

(58) Field of Classification Search
CPC ............ H01M 50/204; H01M 50/242; H01M 50/244; H01M 50/249; H01M 50/64; H01M 2220/20; B60L 50/64; Y02T 10/70
See application file for complete search history.

(56) References Cited

U.S. PATENT DOCUMENTS

| | | | |
|---|---|---|---|
| 10,586,960 B2 | 3/2020 | Seo et al. | |
| 2016/0309624 A1* | 10/2016 | Lei | H05K 7/20927 |
| 2017/0301969 A1* | 10/2017 | Dudley | H01M 50/291 |
| 2018/0183033 A1* | 6/2018 | You | H01M 50/242 |
| 2018/0287116 A1* | 10/2018 | Seo | H01M 50/258 |
| 2019/0013501 A1* | 1/2019 | Sakurai | H01M 50/262 |
| 2020/0176745 A1 | 6/2020 | Lee | |

FOREIGN PATENT DOCUMENTS

| | | |
|---|---|---|
| CN | 206849914 | 1/2018 |
| CN | 210142671 | 3/2020 |
| CN | 210837870 | 6/2020 |

* cited by examiner

Primary Examiner — Scott J. Chmielecki
(74) Attorney, Agent, or Firm — David B. Kelley; Carlson, Gaskey & Olds, P.C.

(57) ABSTRACT

A traction battery assembly includes, among other things, a plurality of battery cells disposed along an axis, an endplate at an axial end of the plurality of battery cells, and a corrugated area of the endplate. The corrugated area has a plurality of corrugations that flatten to accommodate expansion of the plurality of battery cells along the axis.

18 Claims, 5 Drawing Sheets

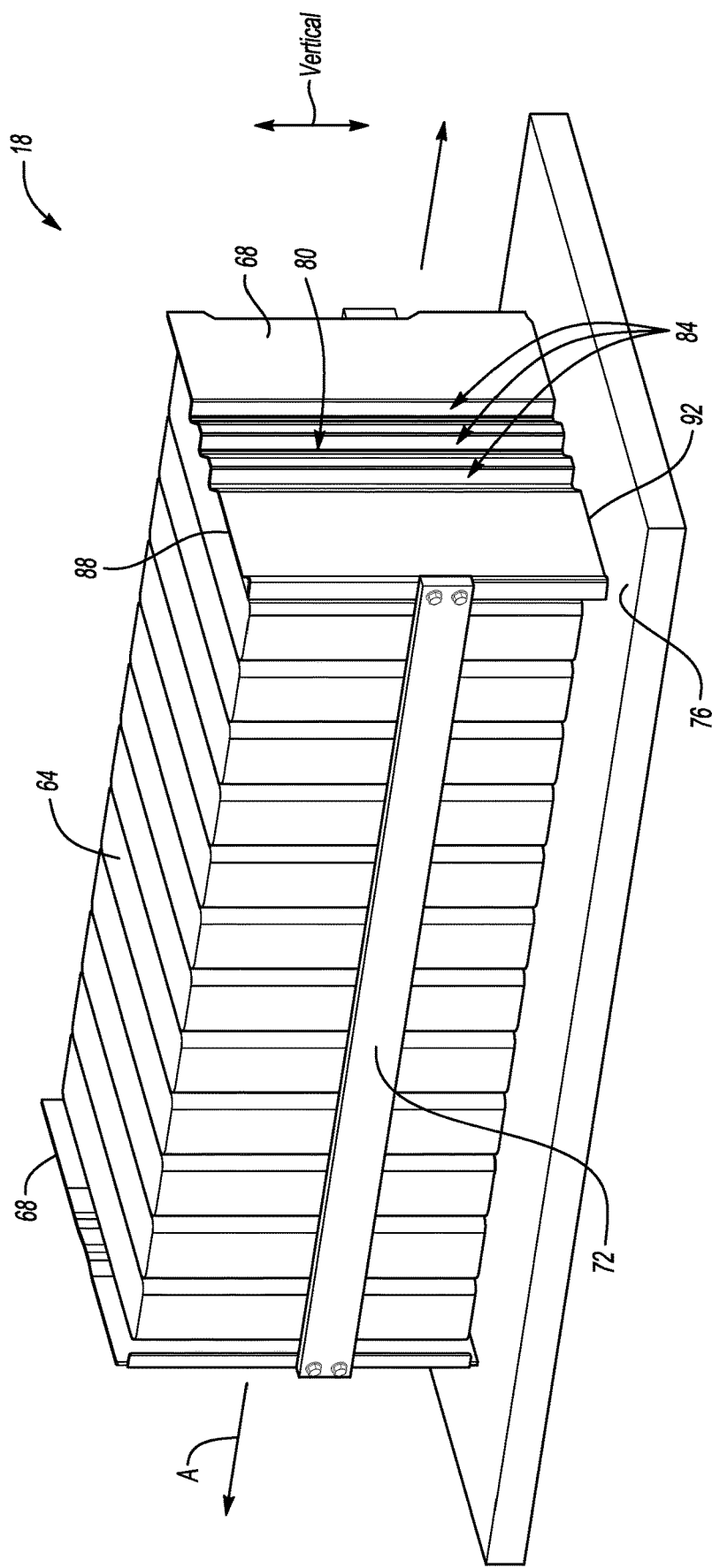

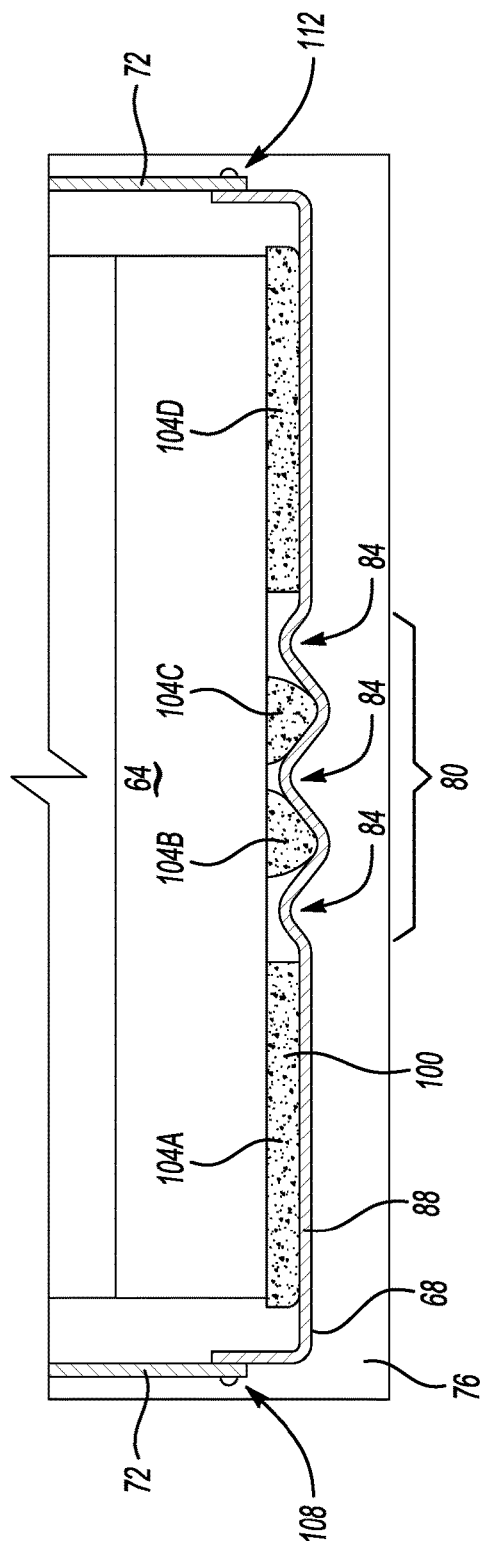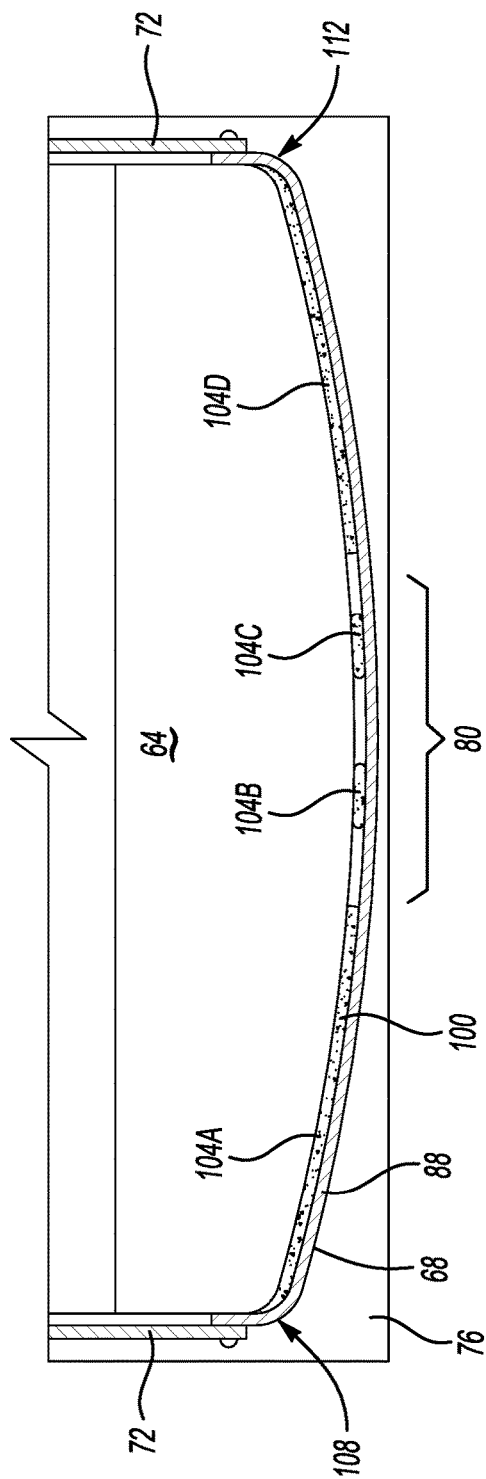

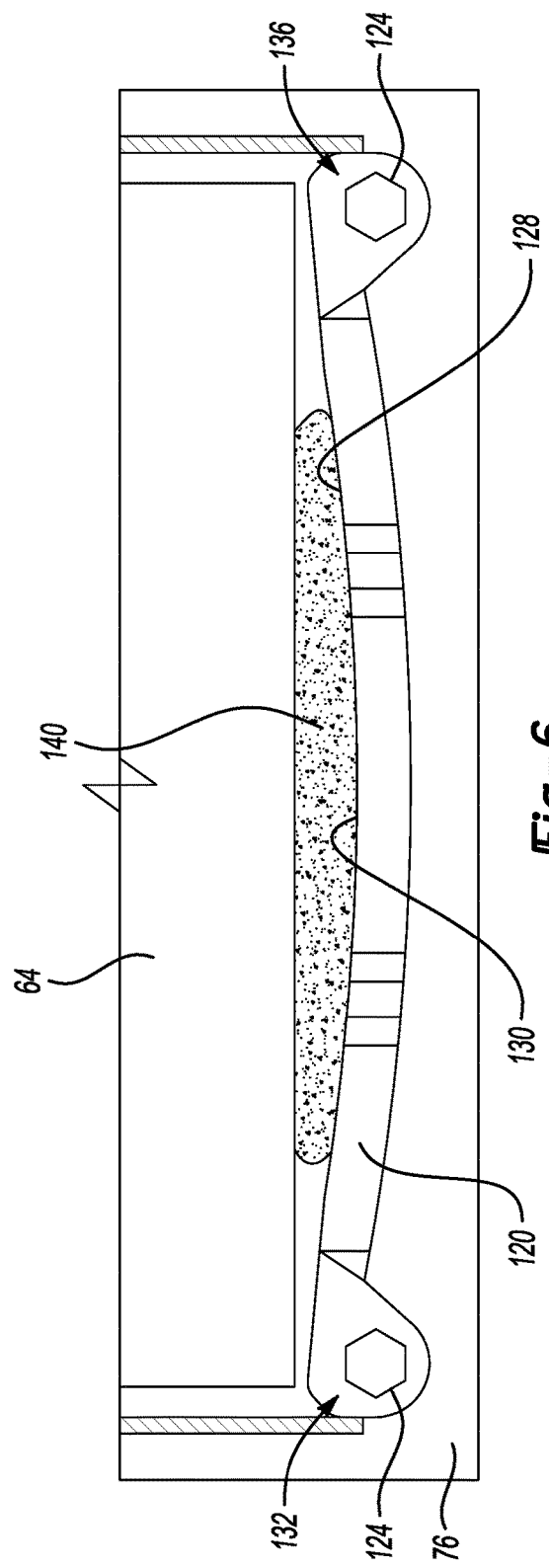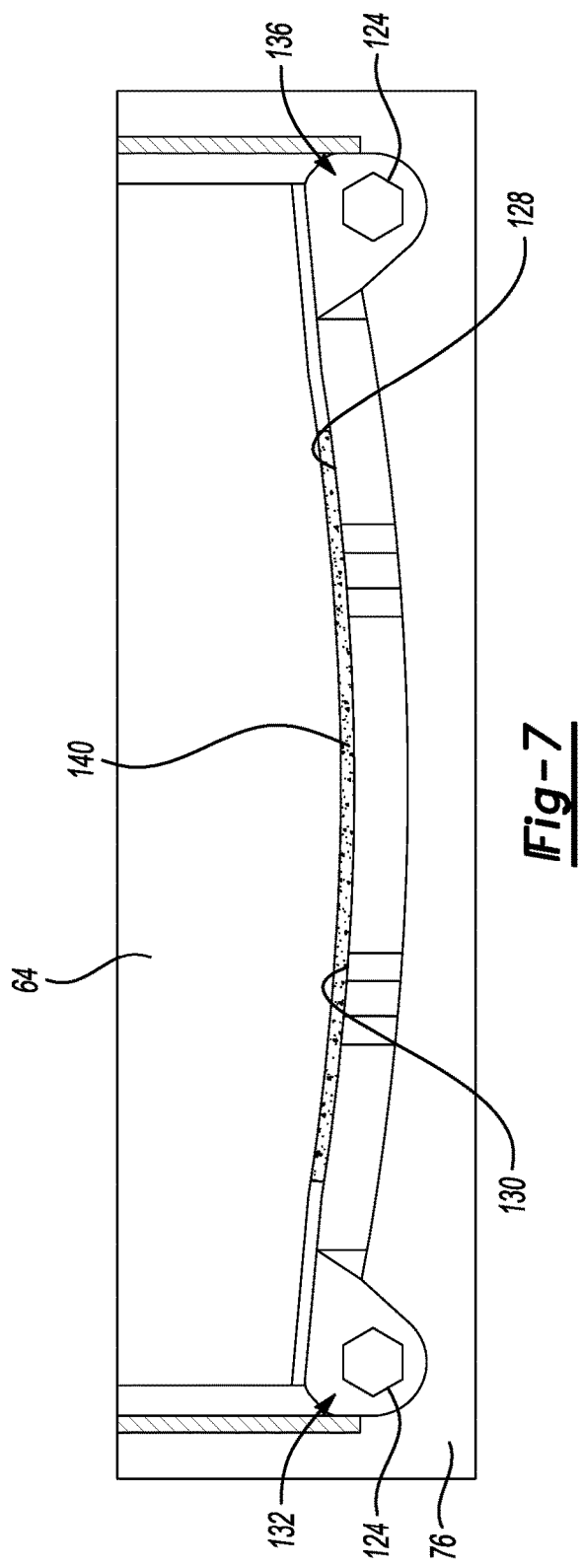

TRACTION BATTERY CELL EXPANSION ACCOMMODATING ENDPLATE AND EXPANSION ACCOMMODATING METHOD

TECHNICAL FIELD

This disclosure relates generally to a traction battery endplate and, more particularly, to an endplate that can accommodate traction battery cells when they expand.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. A traction battery of an electrified vehicle can include a plurality of battery cell assemblies arranged in one or more battery arrays with an enclosure.

SUMMARY

A traction battery assembly according to an exemplary aspect of the present disclosure includes, among other things, a plurality of battery cells disposed along an axis, an endplate at an axial end of the plurality of battery cells, and a corrugated area of the endplate. The corrugated area has a plurality of corrugations that flatten to accommodate expansion of the plurality of battery cells along the axis.

In another example of the foregoing assembly, each of the corrugations in the plurality of corrugations extends longitudinally from a first edge of the endplate to an opposite, second edge of the endplate.

In another example of any of the foregoing assemblies, each of the corrugations in the plurality of corrugations extends longitudinally in a direction that is perpendicular to the axis.

In another example of any of the foregoing assemblies, the first edge is a vertically upper edge and the second edge is vertically lower edge.

Another example of any of the foregoing assemblies includes a compressible material that is disposed axially between the endplate and the plurality of battery cells.

In another example of any of the foregoing assemblies, the compressible material includes a plurality of axially protruding pieces that are axially thickened relative to other portions of the compressible material. Each of the axially protruding pieces is nested within the one of the corrugations within the plurality of corrugations.

In another example of any of the foregoing assemblies, the plurality of axially protruding pieces are spaced a distance from each other and from the other portions of the compressible material such that the each of the axially protruding pieces do not interface with each other and do not interface with the other portions of the compressible material.

In another example of any of the foregoing assemblies, the endplate is configured such that flattening the plurality of corrugations to accommodate expansion of the plurality of battery cells moves the corrugated area axially outward relative to first and a second lateral edges of the endplate.

Another example of any of the foregoing assemblies includes a traction battery of an electrified vehicle. The traction battery has the plurality of battery cells and the endplate.

A traction battery assembly according to another exemplary aspect of the present disclosure includes, among other things, a plurality of battery cells disposed along an axis and an endplate at an axial end of the plurality of battery cells. The endplate has an axially facing side that has a profile that is curved to accommodate expansion of the plurality of battery cells along the axis. The curved profile extends from a first outer edge of the endplate to an opposing, second outer edge of the endplate.

Another example of the foregoing assembly includes a compressible material axially between the plurality of battery cells and the endplate.

In another example of any of the foregoing assemblies, the endplate is directly connected to a thermal exchange plate.

In another example of any of the foregoing assemblies, the profile is a concave profile.

Another example of any of the foregoing assemblies includes a traction battery of an electrified vehicle, the traction battery having the plurality of battery cells and the endplate.

In another example of any of the foregoing assembly, the endplate and a battery pack tray are parts of the same continuous and monolithic tray assembly A method of accommodating expansion of battery cells in a traction battery according to yet another exemplary aspect of the present disclosure includes providing a plurality of battery cells disposed along an axis, and providing an endplate that is curved to accommodate expansion of the plurality of battery cells along the axis.

Another example of the foregoing method includes flattening a plurality of corrugations within a corrugated area of the endplate to provide a curve in the endplate that accommodates expansion of the plurality of battery cells along the axis.

In another example of any of the foregoing methods, expanding the plurality of battery cells along the axis presses a compressible material against the plurality of corrugations to flatten the plurality of corrugations.

In another example of any of the foregoing methods, the endplate is formed with a portion that is curved to accommodate expansion of the plurality of battery cells along the axis.

Another example of any of the foregoing methods includes securing outer lateral sides of the endplate directly to a thermal exchange plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 shows a perspective view of a battery array from the battery pack of FIG. 2.

FIG. 4 shows a top view of an end of the battery array of FIG. 3.

FIG. 5 shows the top view of FIG. 4 after expansion of battery cells axially.

FIG. 6 illustrates a top view of an end of a battery array having an endplate according to another exemplary aspect of the present disclosure.

FIG. 7 illustrates the top view of FIG. 6 after the battery cells have expanded axially.

DETAILED DESCRIPTION

A traction battery pack includes a plurality of battery cells that store energy for powering electrical loads. From time to time, such as when charging the battery cells, the external profile of the battery cells may bulge or swell. The bulging or swelling can cause the dimensions of the battery cells to change, which can undesirably lead to increased pressure on the battery cells, which can present packaging challenges.

Further, pressure exerted on the battery cells during operation can influence the performance of the battery cells. This disclosure details assemblies and methods that accommodate expansion of battery cells in a traction battery. To accommodate expansion, the endplate is curved.

Figure 1:
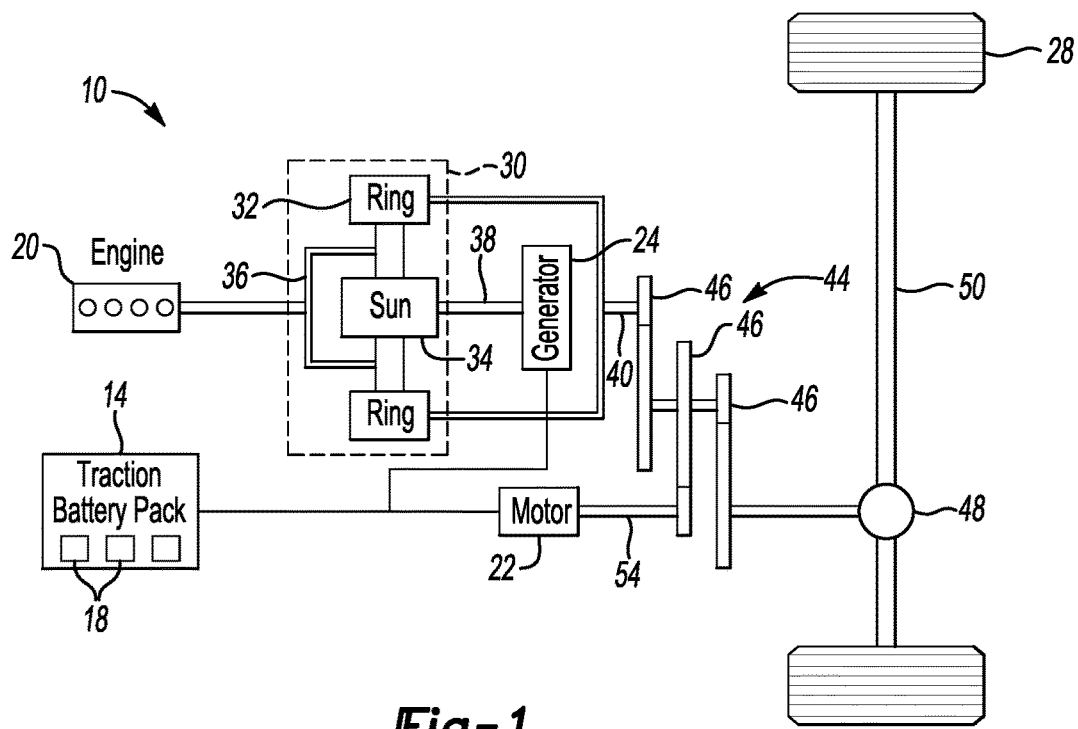
FIG. 1 illustrates a schematic view of a powertrain of an electrified vehicle.

Referring to FIG. 1, a powertrain 10 of a plug-in hybrid electric vehicle (PHEV) includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction batteries in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
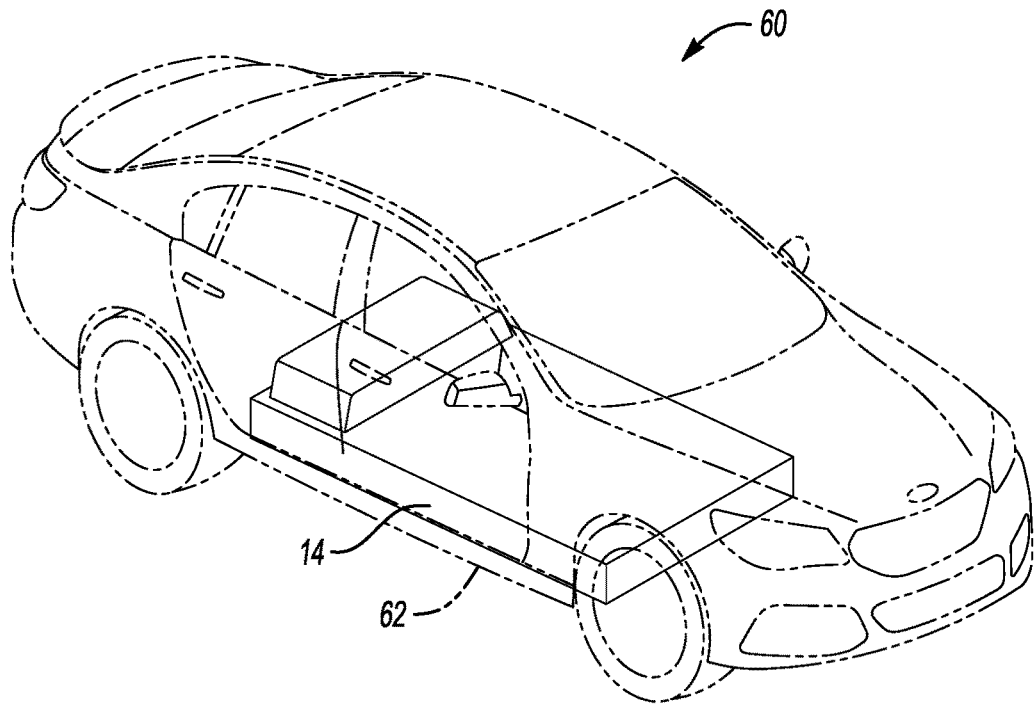
FIG. 2 illustrates a perspective view of an electrified vehicle incorporating the powertrain of FIG. 1.

With reference to FIG. 2, an electrified vehicle 60 incorporates the powertrain 10 of FIG. 1. In the exemplary vehicle 60, the traction battery 14 of the powertrain 10 is positioned adjacent an underbody 62 of the vehicle 60.

With reference now to FIG. 3 and continuing reference to FIG. 2, the traction battery 14 includes, in an exemplary embodiment, three battery arrays 18. Each of the battery arrays 18 includes a plurality of battery cells 64 disposed along an axis A. Endplates 68 are positioned at opposite axial ends of the plurality of battery cells 64. Binding bars 72 extend between the endplates 68 to secure together the plurality of battery cells 64 along the axis A. The binding bars 72 can be secured directly to the endplates 68 with mechanical fasteners, for example. The battery cells 64 and the endplate 68 are disposed upon a thermal exchange plate 76.

With reference to FIG. 4 and continued reference to FIG. 3, the example endplates 68 each include a corrugated area 80, which includes a plurality of corrugations 84. The corrugated area 80 of the example corrugated area 80 include three corrugations 84. In the exemplary embodiment, each of the corrugations 84, extends from a first edge 88 of the respective endplate 68 to an opposite second edge 92. In the exemplary embodiment, the first edge 88 is a vertically upper edge of the endplate 68 and the second edge 92 is a vertically lower edge of the endplate 68. Vertical, for purposes of this disclosure, is with reference to ground and the general orientation of the traction battery 14 during operation of the vehicle 60.

The corrugations 84 each extend longitudinally along a vertical axis. The corrugations 84 extend longitudinally in a direction that is perpendicular to the axis A.

Axially between the endplate 68 and the plurality of battery cells 64 is a compressible material 100. The compressible material 100 can be foam, for example. In this example, the compressible material 100 includes four separate pieces 104A-104D. Each of the pieces 104A-104D is separate and distinct from the other pieces 104-104D. Further, the pieces 104A-104D are each spaced a distance from the other pieces 104A-104D.

The pieces 104B and 104C are considered axially protruding pieces (or beads) because the pieces 104B and 104C protrude axially further from the battery cells 64 than the portions 104A and 104D. The axially protruding pieces 104B and 104C are each nested within one of the corrugations 84 within the corrugated area 80. The axially protruding pieces 104B and 104C are each spaced a distance from each other and do not interface directly with each other or the other pieces 104A and 104D of the compressible material. The pieces 104A and 104D are considered outer pieces as the pieces 104A and 104D are laterally outside the pieces 104B and 104D relative to the axis. One of the pieces 104A is on a first side of the pieces 104B and 104D. The other of the pieces 104D is on an opposite, second side of the pieces 104B and 104C.

Over time, battery cells 64 expand. The expanding battery cells 64 can compress the compressible material 100 and exert force against the endplate 68 causing the endplate 68 to bow axially outward as shown in FIG. 5. The corrugations 84 flatten as the endplate 68 bulges axially outward. The corrugations 84 thus flatten to accommodate expansion of the battery cells 64 along the axis A.

The expanding battery cells 64 move the corrugated area 80 axially outward relative to a first lateral side 108 of the endplate 68 and a second lateral side 112 of the endplate 68. The expanding battery cells 64 also compress the pieces 104A-104D.

With reference now to FIGS. 6 and 7, an endplate 120, according to another exemplary aspect of the present disclosure, is at an axial end of the battery cells 64. The endplate 120 is directly secured to thermal exchange plates 76 via threaded fasteners, here, bolts 124 that extend through apertures in the endplate 120.

The endplate 120 has an axially facing side 128 having a profile 130 that is curved. The profile 130 extends from a first laterally outer edge 132 of the endplate 120 to an opposite, second outer lateral edge 136 of the endplate 120.

After initial assembly, a compressible material 140, such as a foam, is positioned axially between the endplate 120 and the battery cells 64. As the battery cells 64 expand over time, the battery cells 64 compress the compressible material 140 and are accommodated within the profile 130 of the endplate 120. The profile 130 of the side 128 of the endplate 120 is concave in this example.

Figure 8:
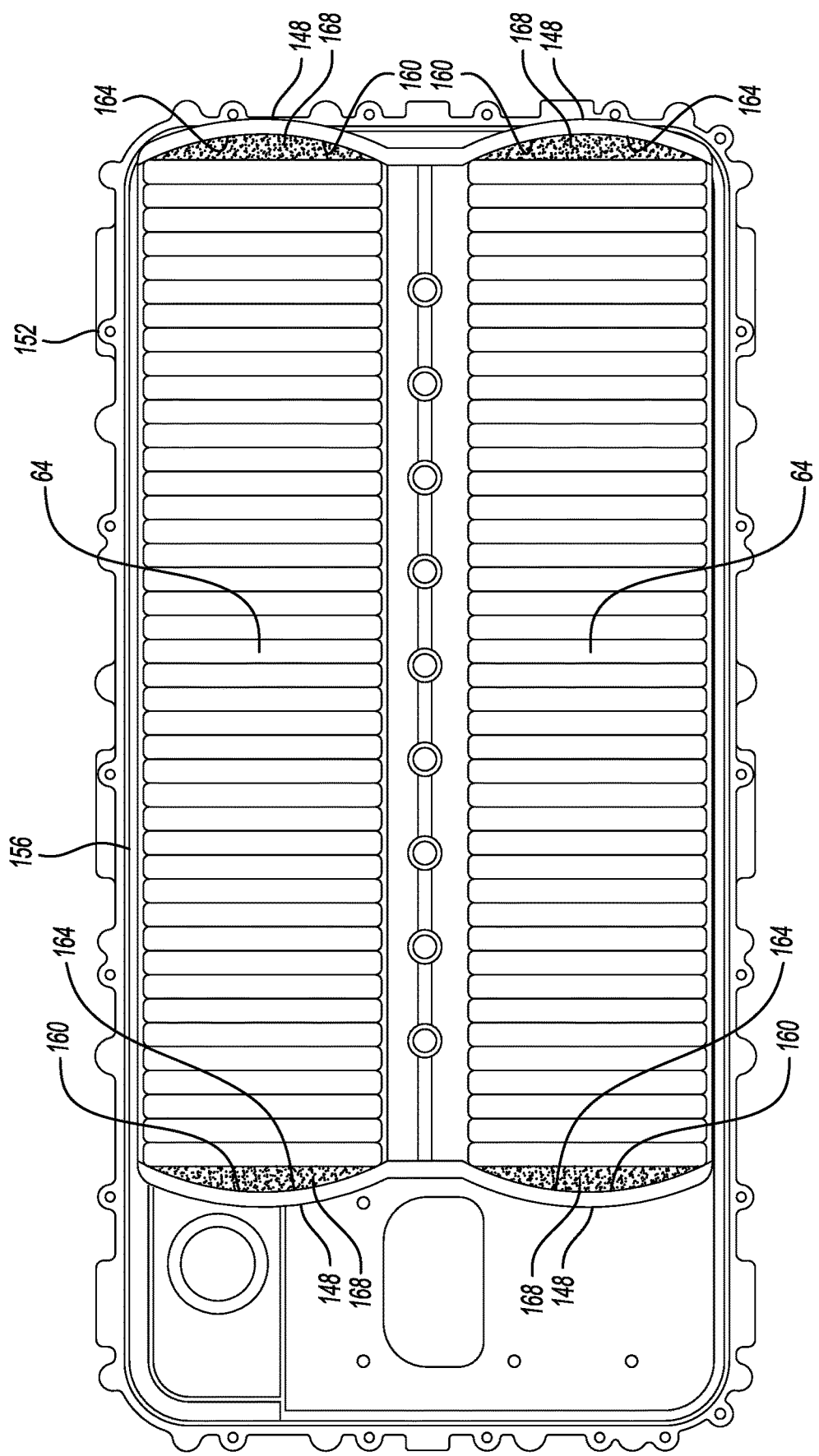
FIG. 8 illustrates a top view of two battery arrays each having an endplate according to yet another exemplary aspect of the present disclosure.

Referring to FIG. 8, an endplate 148, according to yet another exemplary aspect of the present disclosure can be part of a battery pack tray assembly 152. In addition to the endplates 148, the battery pack tray assembly 152 includes a tray portion 156. The battery cells 64 are supported on the tray portion 156 and held axially between opposing endplates 148 of the battery pack tray assembly 152. The endplate 148 can be a continuous, uninterrupted portion of the tray assembly 152. Put another way, the tray assembly 152 is a single component having a region that provides the tray portion 156 and other regions that provide the endplates 148. Endplate structures separate from the tray assembly 156 are not required in the embodiment of FIG. 8, which can be referred to a cell-to-case assembly.

The endplates 148 each have an axially facing side 160 having a profile 164 that is curved. Between the sides 160 and the battery cells 64 is compressible material 168. As the battery cells 64 expand axially over time, the battery cells 64 compress the compressible material 164 and are accommodated within profile 164 of the endplates 148.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
a plurality of battery cells disposed along an axis;
an endplate at an axial end of the plurality of battery cells; and
a corrugated area of the endplate, the corrugated area having a plurality of corrugations that flatten to accommodate expansion of the plurality of battery cells along the axis, the plurality of corrugations established within a side of the endplate that faces the plurality of battery cells and in an opposite side of the endplate that faces away from the plurality of battery cells.

2. The assembly of claim 1, wherein each of the corrugations in the plurality of corrugations extends longitudinally from a first edge of the endplate to an opposite, second edge of the endplate.

3. The assembly of claim 2, wherein each of the corrugations in the plurality of corrugations extends longitudinally in a direction that is perpendicular to the axis.

4. The assembly of claim 2, wherein the first edge is a vertically uppermost edge and the second edge is a vertically lowermost edge.

5. A traction battery assembly, comprising:
a plurality of battery cells disposed along an axis;
an endplate at an axial end of the plurality of battery cells;
a corrugated area of the endplate, the corrugated area having a plurality of corrugations that flatten to accommodate expansion of the plurality of battery cells along the axis; and
a compressible material that is disposed axially between the endplate and the plurality of battery cells, the compressible material separate from the endplate and separate from the plurality of battery cells.

6. A traction battery assembly, comprising:
a plurality of battery cells disposed along an axis;
an endplate at an axial end of the plurality of battery cells;
a corrugated area of the endplate, the corrugated area having a plurality of corrugations that flatten to accommodate expansion of the plurality of battery cells along the axis; and
a compressible material that is disposed axially between the endplate and the plurality of battery cells,
wherein the compressible material includes a plurality of axially protruding pieces that are axially thickened relative to other portions of the compressible material, each of the axially protruding pieces nested within the one of the corrugations within the plurality of corrugations.

7. The assembly of claim 6, wherein the plurality of axially protruding pieces are spaced a distance from each other and from the other portions of the compressible material such that the each of the axially protruding pieces do not interface with each other and do not interface with the other portions of the compressible material.

8. The assembly of claim 1, wherein the endplate is configured such that flattening the plurality of corrugations to accommodate expansion of the plurality of battery cells moves the corrugated area axially outward relative to first and a second lateral edges of the endplate.

9. The assembly of claim 1, further comprising a traction battery of an electrified vehicle, the traction battery having the plurality of battery cells and the endplate.

10. A traction battery assembly, comprising:
a plurality of battery cells disposed along an axis; and
an endplate at an axial end of the plurality of battery cells, the endplate having an axially facing side that has a profile that is curved to accommodate expansion of the plurality of battery cells along the axis, the curved profile extending from a first outer edge of the endplate to an opposing, second outer edge of the endplate.

11. The traction battery assembly of claim 10, further comprising a compressible material axially between the plurality of battery cells and the endplate.

12. The traction battery assembly of claim 10, wherein the endplate is directly connected to a thermal exchange plate.

13. The traction battery assembly of claim 10, wherein the profile is a concave profile.

14. The traction battery assembly of claim 10, further comprising a traction battery of an electrified vehicle, the traction battery having the plurality of battery cells and the endplate.

15. The traction battery assembly of claim 10, wherein the endplate and a battery pack tray are parts of the same continuous and monolithic tray assembly.

16. The assembly of claim 1, wherein the endplate bulges axially outward when the plurality of corrugations flatten to accommodate expansion of the plurality of battery cells along the axis.

17. The assembly of claim 5, wherein the compressible material is foam.

18. The traction battery assembly of claim 10, wherein the axially facing side faces the plurality of battery cells.

\* \* \* \* \*